US009326158B2

(12) United States Patent
Abraham et al.

(10) Patent No.: US 9,326,158 B2
(45) Date of Patent: Apr. 26, 2016

(54) METHOD AND APPARATUS FOR COMMUNICATING WITH EXTENDED RANGE IN A WIRELESS NETWORK (75) Inventors: Santosh Paul Abraham, San Diego, CA (US); Simone Merlin, San Diego, CA (US); Maarten Menzo Wentink, Naarden (NL); Didier Johannes Richard Van Nee, De Meern (NL)

(73) Assignee: Qualcomm Incorporated, San Diego, CA (US)

( * ) Notice: Subject to any disclaimer, the term of this patent is extended or adjusted under 35 U.S.C. 154(b) by 551 days.

(21) Appl. No.: 13/588,351

(22) Filed: Aug. 17, 2012

(65) Prior Publication Data

US 2013/0208607 A1    Aug. 15, 2013

Related U.S. Application Data (60) Provisional application No. 61/525,749, filed on Aug. 20, 2011.

(51) Int. Cl.
*H04W 16/26* (2009.01)
*H04W 74/08* (2009.01)
*H04J 1/16* (2006.01)

(52) U.S. Cl.
CPC .......... *H04W 16/26* (2013.01); *H04W 74/0816* (2013.01)

(58) Field of Classification Search
CPC .................................................... H04W 16/26
USPC ......................................... 370/252, 278, 329
See application file for complete search history.

(56) References Cited

U.S. PATENT DOCUMENTS 6,813,260 B1   11/2004   Fogle
7,403,539 B1    7/2008   Tang et al.
8,059,607 B1   11/2011   Shaw et al.
(Continued)

FOREIGN PATENT DOCUMENTS

WO    2006109213 A1    10/2006

OTHER PUBLICATIONS

Chun-Ting Chou et al: "Inter-frame space (IFS) based service differentiation for ieee 802.11 wireless LANs" Vehicular Technology Conference, 2003, VTC 2003—Fall, 2003 IEEE 58th Orlando, FL, USA Oct. 6-9, 2003; [IEEE Vehicular Technolgy Conference], Piscataway, NJ, USA, IEEE, US, vol. 3, Oct. 6, 2003, pp. 1412-1416, XP010702439, DOI: 10.1109/VETECF.2003.1285257 ISBN: 978-0-7803-7954-1.
(Continued)

*Primary Examiner* — John Pezzlo
(74) *Attorney, Agent, or Firm* — Kevin T. Cheatham (57) ABSTRACT Techniques for supporting communication over an extended range in a wireless network are disclosed. In one aspect, a station sends multiple messages of a given type for different operating modes. These messages can be detected by stations with different capabilities, which may avoid collisions between stations. In one design, a first station receives a Request-to-Send (RTS) message from a second station having data to send. The first station sends a first Clear-to-Send (CTS) message and also a second CTS message in response to the RTS message. The second CTS message has an extended range as compared to the first CTS message. The first station thereafter (i) receives data sent by the second station in response to the second CTS message and (ii) sends an acknowledgement having an extended range.

17 Claims, 9 Drawing Sheets

(56) References Cited

U.S. PATENT DOCUMENTS

| | | | |
|---|---|---|---|
| 2002/0110085 A1 | 8/2002 | Ho et al. | |
| 2003/0145095 A1 | 7/2003 | Liu et al. | |
| 2005/0026639 A1 | 2/2005 | Lewis | |
| 2005/0232275 A1 | 10/2005 | Stephens | |
| 2007/0010237 A1 | 1/2007 | Jones et al. | |
| 2007/0133447 A1 | 6/2007 | Wentink | |
| 2007/0171858 A1 | 7/2007 | Grandhi et al. | |
| 2010/0232324 A1* | 9/2010 | Radunovic | H04L 12/413 370/277 |
| 2011/0310735 A1* | 12/2011 | Karagiannis | H04L 43/045 370/232 |
| 2011/0310807 A1 | 12/2011 | Grandhi et al. | |

OTHER PUBLICATIONS

"IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput" IEEE Std 802.11n-2009 (Amendment to IEEE Std 802 .Nov. 2007), IEEE Standard, IEEE, Piscataway, NJ, USA, Oct. 29, 2009), pp. 1-565, XP017694836, ISBN: 978-0-7381-6046-7.

International Search Report—PCT/US2012/051604—ISA/EPO—Nov. 28, 2012.

N/A: "Joint Proposal Mac Specification ;11-05-1095-02-000n-joint-proposal-mac-specification" IEEE Draft; 11-05-1095-02-000N-Joint-Proposal-Mac-Spec Ification, IEEE-SA Mentor, Piscataway, NJ, USA, vol. 802 .11n, No. 2, Nov. 17, 2005, pp. 1-37, XP017688321.

N/A: "Wwise Complete Proposal Presentation Jul. 2005; 11-05-0737-01-000n-wwise-complete-proposal -presentation-Jul. 2005", IEEE Draft; 11-05-0737-01-000N-Wwise-Complete-Proposal-Presentation-Jul. 2005, IEEE-SA Mentor, Piscataway, NJ, USA, vol. 802 .11n, No. 1, Jul. 19, 2005, pp. 1-35, XP017688777.

* cited by examiner

METHOD AND APPARATUS FOR COMMUNICATING WITH EXTENDED RANGE IN A WIRELESS NETWORK

CLAIM OF PRIORITY UNDER 35 U.S.C. §119

The present application claims priority to provisional U.S. Application Ser. No. 61/525,749, entitled "SYSTEMS AND METHODS FOR RANGE EXTENSION OF WIRELESS COMMUNICATION," filed Aug. 20, 2011, and incorporated herein by reference in its entirety.

BACKGROUND

I. Field

The present disclosure relates generally to communication, and more specifically to techniques for communicating in a wireless network.

II. Background

Wireless networks are widely deployed to provide various communication services such as voice, video, packet data, etc. These wireless networks may be capable of supporting communication for multiple users by sharing the available network resources. Examples of such wireless networks include wireless wide area networks (WWANs) supporting communication for large geographic areas (e.g., cites, states, or countries), wireless metropolitan area networks (WMANs) supporting communication for medium-size geographic areas, wireless local area networks (WLANs) supporting communication for small geographic areas (e.g., homes, shops, etc.), and wireless personal area networks (WPANs) supporting communication for very small geographic areas (e.g., rooms). The terms "network" and "system" are often used interchangeably.

A wireless network may include one or more access points (APs) that can support communication for one or more stations (STAs). An access point may communicate with a station via a radio technology supported by the wireless network. The design of the radio technology (e.g., coding, modulation, etc.) as well as other constraints (e.g., maximum transmit power) may result in a limit on the range at which the access point can reliably communicate with the station.

SUMMARY

Techniques for supporting communication over an extended range in a wireless network are disclosed herein. In one aspect of the present disclosure, a station may send multiple messages of a given type for different operating modes, e.g., an extended range mode and a non-extended range mode. These messages can be detected by stations with different capabilities, which may avoid collisions between stations.

In one design, a first station may receive a Request-to-Send (RTS) message from a second station having data to send. The first station may send a first Clear-to-Send (CTS) message in response to the RTS message. The first station may also send a second CTS message following the first CTS message. The second CTS message may have an extended range as compared to the first CTS message. The second CTS message may include a preamble of a longer length than a preamble of the first CTS message. For example, the second CTS message may include repetitions of at least one training field. The first CTS message may be intended for stations not supporting an extended range mode. The second CTS message may be intended for the second station and other stations supporting the extended range mode. The first station may thereafter receive data sent by the second station in response to the second CTS message. The first station may send acknowledgement (ACK) having an extended range for the received data.

In another aspect of the present disclosure, a station may make energy measurements over multiple time slots during a backoff procedure in order to support co-existence between stations supporting different operating modes. In one design, the station may make energy measurements of a wireless medium during the backoff procedure, with each energy measurement being made over a measurement period covering multiple time slots. The station may determine whether the wireless medium is clear or busy in each measurement period based on an energy measurement for that measurement period. The station may determine whether to continue or suspend the backoff procedure in each measurement period based on a determination of whether the wireless medium is clear of busy during the measurement period.

Various aspects and features of the disclosure are described in further detail below.

DETAILED DESCRIPTION

The range extension techniques disclosed herein may be used for various wireless networks such as WLANs, WWANs, WMANs, WPANs, etc. A WLAN may implement one or more standards in the IEEE 802.11 family of standards developed by The Institute of Electrical and Electronics Engineers (IEEE) for WLANs.

Figure 1:
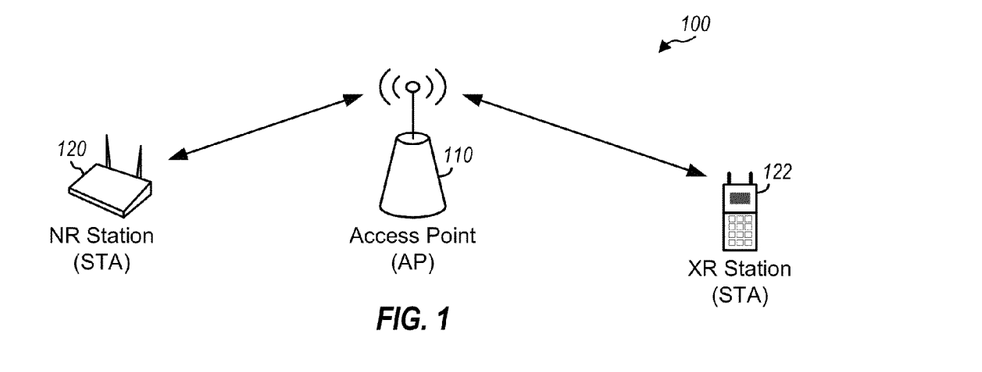
FIG. 1 shows an exemplary wireless network.

FIG. 1 shows an exemplary wireless network 100 with an access point (AP) 110 and two stations (STAs) 120 and 122. In general, a wireless network may include any number of access points and any number of stations. A station is a device that can communicate with another station via a wireless medium. The terms "wireless medium", "wireless channel" and "channel" are synonymous and are often used interchangeably. A station may communicate with an access point or peer-to-peer with another station. A station may also be referred to as a terminal, an access terminal, a mobile station, a user equipment (UE), a subscriber station, a node, etc. A station may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc.

An access point is a station that can support communication (e.g., provide access to distribution services) via the wireless medium for stations associated with that access point. An access point may also be referred to as a base station, a base transceiver subsystem (BTS), a Node B, an evolved Node B (eNB), etc. An access point may be a device designed to operate as an access point and to perform functions normally performed by an access point. An access point may also be a station that elected to perform the functions of an access point, e.g., in an ad-hoc network.

Wireless network 100 may be a WLAN that implements the IEEE 802.11 family of standards. For example, wireless network 100 may implement IEEE 802.11, 802.11a, 802.11ah, 802.11b, 802.11e, 802.11g, 802.11n, 802.11s, etc. IEEE 802.11, 802.11a, 802.11ah, 802.11b, 802.11g and 802.11n cover different radio technologies (i.e., different medium access technologies) and have different capabilities. IEEE 802.11e covers quality of service (QoS) enhancements for a medium access control (MAC) layer. 802.11ah utilizes orthogonal frequency-division multiplexing (OFDM). 802.11ah can support transmission over a relatively long range (e.g., about one kilometer or longer) with lower power consumption as compared to other radio technologies in the 802.11 family. 802.11ah may be used for sensors, metering, and smart grid networks and may provide increased battery life as compared to other radio technologies.

Wireless network 100 may operate in any suitable frequency band. For example, wireless network 100 may operate in an industrial, scientific and medical (ISM) band from 2.4 to 2.5 GHz, or an unlicensed national information infrastructure (U-NII) band from 5.15 to 5.825 GHz, or a band lower than 1 GHz (e.g., for 802.11ah).

Wireless network 100 may support an extended range (XR) mode of operation in order to extend the range of communication. The XR mode may utilize repetition and/or other techniques in order to provide a desired improvement (e.g., approximately 8 dB of improvement) in link budget over a non-extended range (NR) mode of operation. The NR mode may also be referred to as a normal mode, a nominal mode, etc.

Figure 2:
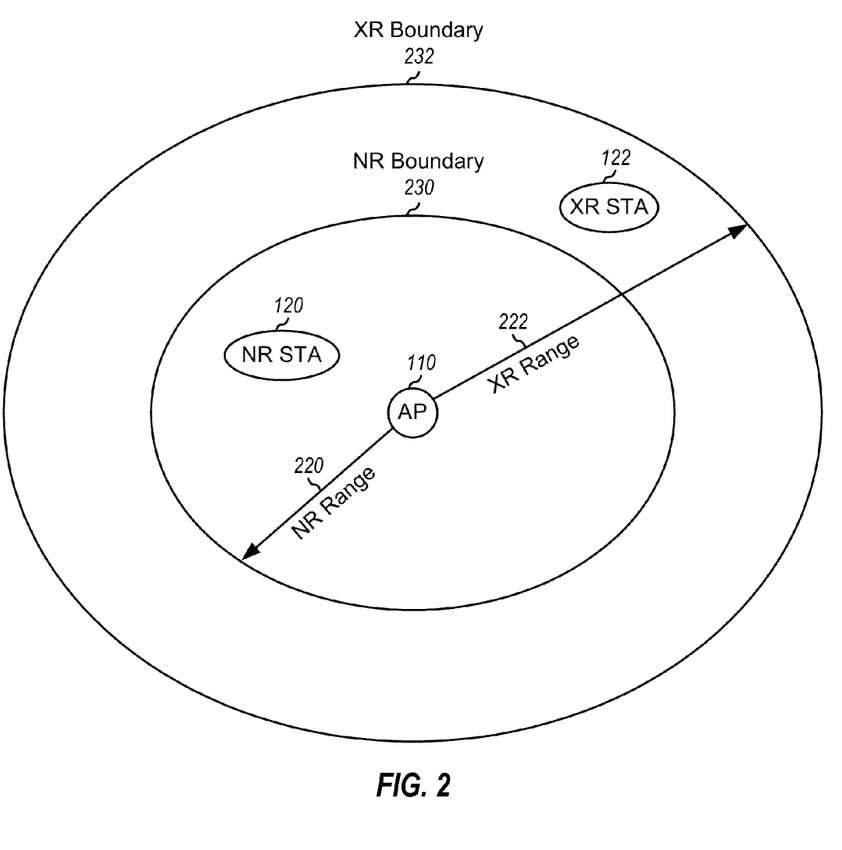
FIG. 2 shows coverage of the wireless network in FIG. 1.

FIG. 2 shows coverage of wireless network 100 in FIG. 1. Access point 110 may communicate with stations 120 and 122. Station 120 may operate in the NR mode and may be referred to as an NR station, an NR STA, an NR node, a legacy station, etc. Station 122 may operate in the XR mode and may be referred to as an XR station, an XR STA, an XR node, a new station, etc.

As shown in FIG. 2, the coverage of access point 110 in the NR mode may be defined by (i) a range 220 that may be referred to as an NR range and (ii) a boundary 230 that may be referred to as an NR boundary. The NR range and the NR boundary may be dependent on various factors such as the radio technology utilized for the NR mode, the transmit power level in the NR mode, the propagation environment, etc. The coverage of access point 110 in the XR mode may be defined by (i) a range 222 that may be referred to as an XR range and (ii) a boundary 232 that may be referred to as an XR boundary. The XR range and the XR boundary may be dependent on various factors such as the radio technology utilized for the NR mode, the transmit power level in the XR mode, the propagation environment, etc.

In the example shown in FIG. 2, NR station 120 is located within the NR boundary, and XR station 122 is located within the XR boundary. NR station 120 may communicate with access point 110 using a radio technology for the NR mode. XR station 122 may communicate with access point 110 using a radio technology for the XR mode.

It may be desirable to support co-existence between NR station 120 and XR station 122 within wireless network 100. However, co-existence may be problematic or not possible if transmissions from XR station 122 cannot be detected by NR station 120. In this case, transmissions from XR station 122 may collide with transmissions from NR station 120. Each station may perform clear channel assessment (CCA) in order to determine whether the wireless medium is clear or busy prior to transmitting on the wireless medium. If NR station 120 is unable to detect transmissions from XR station 122, then NR station 120 may incorrectly determine that the wireless medium is clear and may transmit at the same time as XR station 122, thereby causing a collision between the transmission from NR station 120 and the transmission from XR station 122. Collisions may thus be caused by XR station 122 being "hidden" from NR station 120, which may be referred to as a hidden node problem.

Computer simulation was performed to determine the extent of the hidden node problem for co-existence between NR stations and XR stations. In the computer simulation, NR station 120 was randomly placed within NR boundary 230, and XR station 122 was randomly placed within XR boundary 232. The computer simulation indicates that NR station 120 may not be able to properly determine whether the wireless medium is clear in a large percentage (e.g., more than 50%) of the time because NR station 120 was unable to detect transmissions from XR station 122. The hidden node problem may be addressed as described below.

Figure 3:
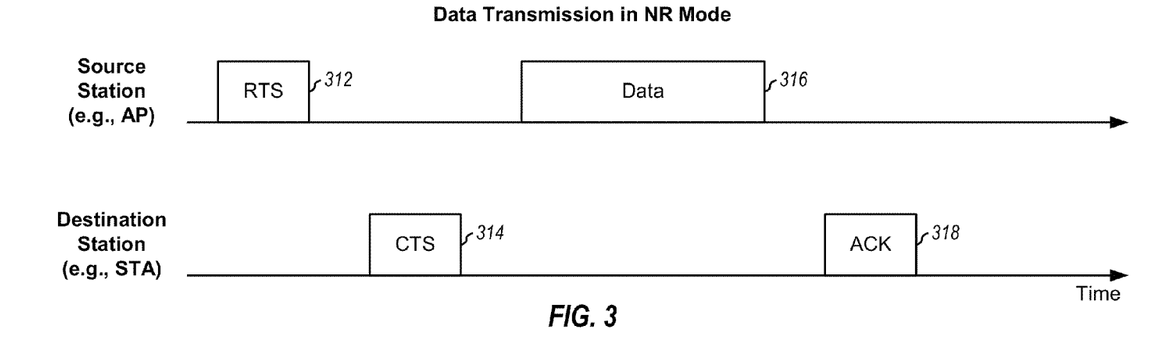
FIG. 3 shows data transmission in the non-extended range (NR) mode.

FIG. 3 shows data transmission in the NR mode in accordance with IEEE 802.11. A source station (e.g., access point 110) may initially transmit an RTS message 312 via the wireless medium. A message may also be referred to as a frame, a packet, a protocol data unit, etc. A destination station (e.g., NR station 120) may receive the RTS message and may respond by transmitting a CTS message 314. The source station may receive the CTS message and may transmit data 316 in response to the CTS message. The destination station may receive the data and return acknowledgement (ACK) 318.

As shown in FIG. 3, RTS and CTS messages may be sent prior to data transmission in order to protect against hidden nodes. The RTS and CTS messages may indicate to other stations that the wireless medium will be used for a predetermined period of time by the source station and the destination station and that other stations should not transmit on the wireless medium during this period. However, the RTS and CTS messages are only effective when they can be detected by other stations.

In one aspect of the present disclosure, extended range Request-to-Send messages (XR RTS messages) and/or extended range Clear-to-Send messages (XR CTS messages) may be used to support data transmission in the XR mode and to mitigate the hidden node problem. A message in IEEE 802.11 may include a preamble and a payload. An XR message may include a longer preamble than a corresponding NR message, as described below. XR RTS messages and/or XR CTS messages may allow NR stations to detect XR stations.

Figure 4:
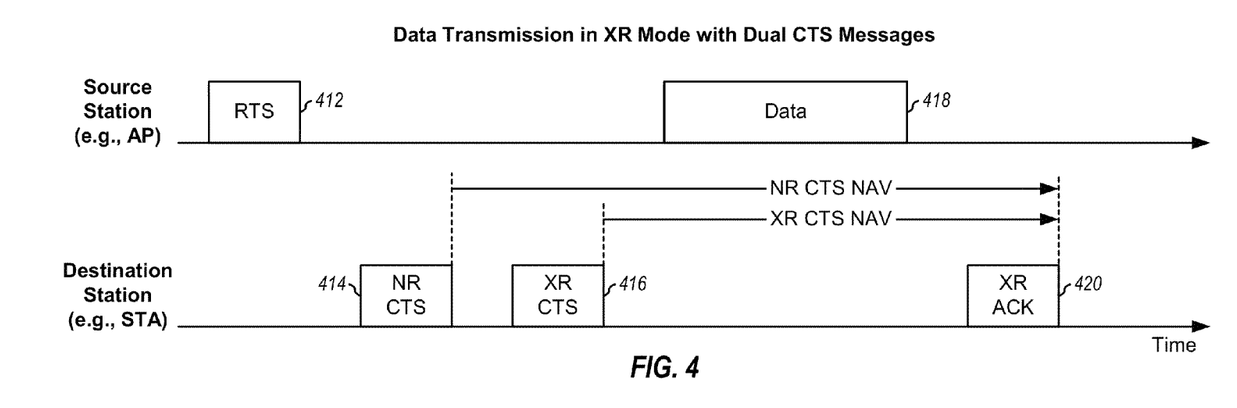
FIG. 4 shows a design of data transmission in the extended range (XR) mode.

FIG. 4 shows an exemplary design of data transmission in the XR mode. The design in FIG. 4 can support co-existence between XR stations and NR stations with dual CTS messages. As shown in FIG. 4, a source station (e.g., access point 110) may initially transmit an RTS message 412 via the wireless medium. RTS message 412 may be an NR RTS message for the NR mode or an XR RTS message for the XR mode. A destination station (e.g., XR station 122) may receive the RTS message and may respond by transmitting an NR CTS message 414 followed by an XR CTS message 416. NR CTS message 414 may be a normal CTS message in IEEE 802.11 and may be detectable by NR stations (e.g., NR station 120), which may address the hidden node problem. XR CTS message 416 may be intended for the source station, which may support the XR mode. The source station may receive the CTS messages and may transmit data 418 in response to XR CTS message 416. The destination station may then return ACK 420.

Although not shown in FIG. 4, XR station 122 may receive RTS message 412 and may transmit an XR CTS message in response. In this case, NR station 120 may not be able to detect the XR CTS message, which may then result in collision between NR station 120 and XR station 122.

To mitigate the hidden node problem, XR station 122 may transmit dual CTS messages 414 and 416 for any RTS message received by the XR station, as shown in FIG. 4. NR CTS message 414 may enable NR station 120 to detect XR station 122. NR CTS message 414 may include a duration field, which may indicate a transmission time of T1 for subsequent data. The duration indicated by NR CTS message 414 may also be referred to as NR CTS NAV. NR station 120 may receive NR CTS message 414 and may determine that the wireless medium will be busy for a period of T1 indicated by the duration field of CTS message 414. NR station 120 may set its network allocation vector (NAV) to T1 and may refrain from accessing the wireless medium until its NAV counts down to zero. The subsequent transmission of XR CTS message 416 and ACK 420 from XR station 122 may then be protected from collisions from NR station 120. NR station 120 may still experience collisions from XR station 122 when these stations are separated beyond the XR range. However, the interference from these stations may be low enough in most instances to allow for reliable reception.

As shown in FIG. 4, XR CTS message 416 may also include a duration field, which may indicate a transmission time of T2 for subsequent data. The duration indicated by XR CTS message 416 may also be referred to as XR CTS NAV. Other XR stations (if any) may receive XR CTS message 416, set their NAVs to T2, and refrain from accessing the wireless medium until their NAVs count down to zero. The subsequent transmission of ACK 420 from XR station 122 may then be protected from collisions with transmissions from other XR stations. Transmission times T1 and T2 may be set such that the NAVs of both NR stations and XR stations count down to zero at or after the end of the ACK transmission.

The exemplary design in FIG. 4 may mitigate the hidden node problem even when NR station 120 does not support the XR mode and is unable to receive/detect XR messages. Transmission of NR CTS message 414 may alert NR station 120 of impending transmissions on the wireless medium. NR station 120 may then refrain from transmitting on the wireless medium for the duration indicated by NR CTS message 414 and may avoid causing collisions with XR station 122.

Figure 5:
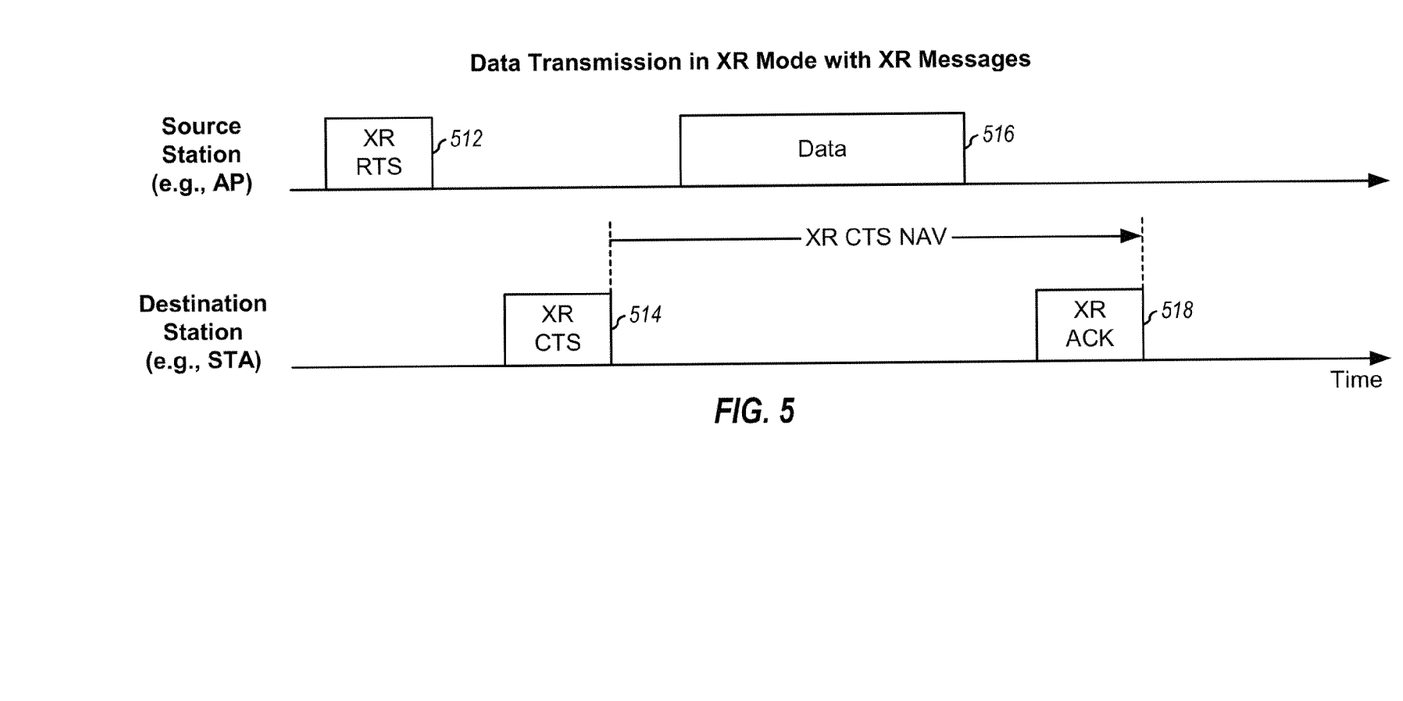
FIG. 5 shows another design of data transmission in the XR mode.

FIG. 5 shows an exemplary design of data transmission in the XR mode with XR messages. The design in FIG. 5 can support co-existence between XR stations and NR stations, with the NR stations being capable of receiving/detecting XR messages. As shown in FIG. 5, a source station (e.g., access point 110) may initially transmit an XR RTS message 512 via the wireless medium. A destination station (e.g., XR station 122) may receive the XR RTS message and may respond by transmitting an XR CTS message 514. The source station may receive XR CTS message 514 and may transmit data 516 in response to the XR CTS message. The destination station may then return ACK 518. As shown in FIG. 5, XR messages may be used to protect against hidden nodes when NR stations support the XR mode and can receive/detect XR messages.

For both FIGS. 4 and 5, data may be transmitted with repetition for extended range or without repetition. ACK may be transmitted subsequent to data within the XR CTS NAV and may comprise an XR ACK.

Figure 6:
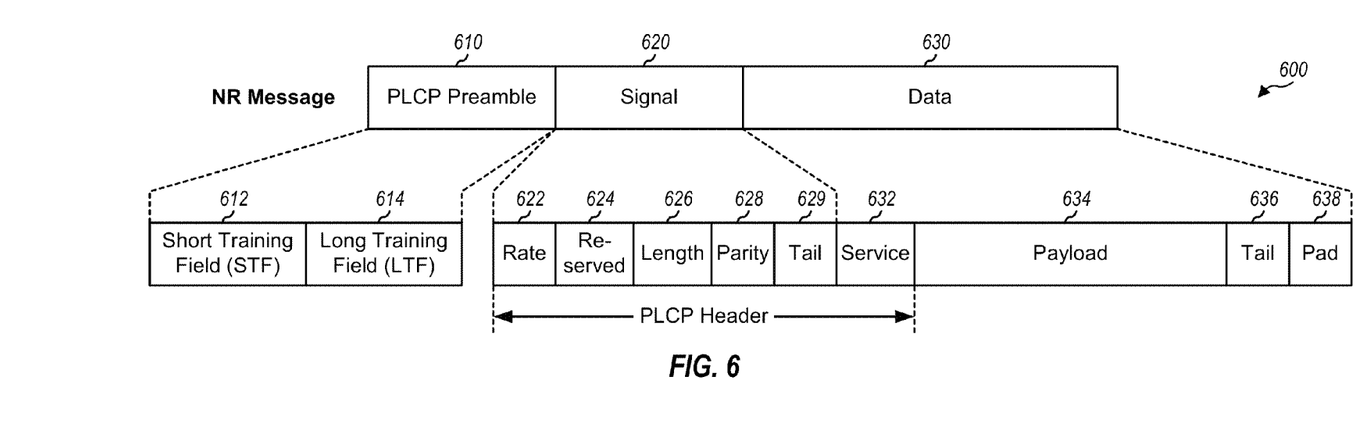
FIG. 6 shows a message for the NR mode.

FIG. 6 shows an exemplary NR message 600 that may be used in the NR mode. Message 600 includes a preamble field 610, a signal field 620, and a data field 630. The format of preamble field 610 may be dependent on radio technology. For 802.11a, preamble field 610 includes a short training field (STF) 612 and a long training field (LTF) 614. STF 612 includes 10 repetitions of a short training sequence, which may be used for automatic gain control (AGC), timing acquisition, coarse frequency acquisition, etc. LTF 614 includes two repetitions of a long training sequence, which may be used for channel estimation, fine frequency acquisition, etc. For 802.11a, signal field 620 includes a rate field 622 indicating a modulation and coding scheme for data sent in data field 630, a reserved bit field 624, a length field 626 indicating the size of data field 630, a parity bit field 628, and a tail bit field 629 containing zeros. Data field 630 includes a service field 632 indicating an initialization state of a scrambler, a payload field 634 carrying data, a tail bit field 636 containing zeros, and a pad bit field 638 containing padding bits. A physical layer convergence protocol (PLCP) header includes all of the fields in signal field 620 as well as service field 632 in data field 630.

FIG. 6 shows an exemplary design of a message in the NR mode. A message in the NR mode may also include fewer, different, and/or additional fields.

Figure 7:
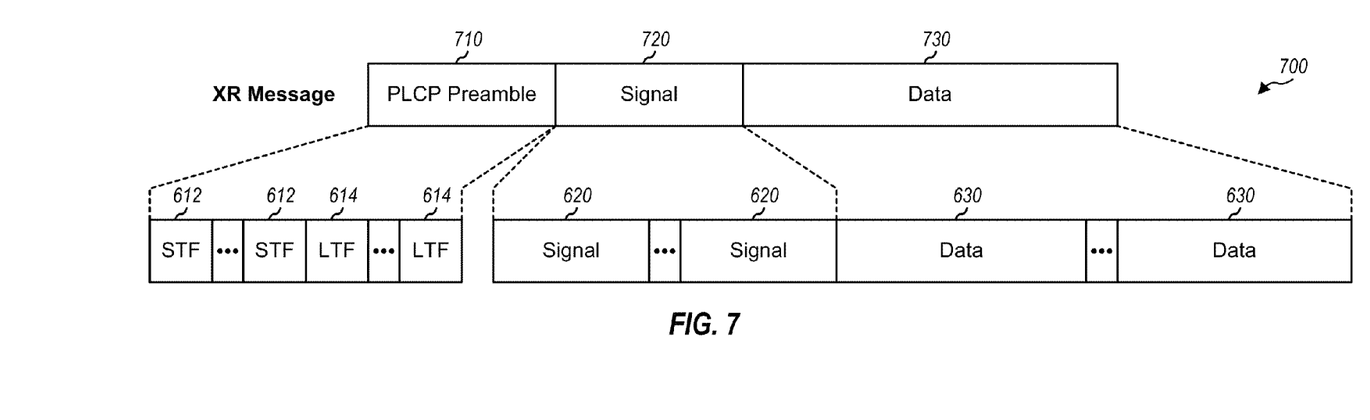
FIG. 7 shows a message for the XR mode.

FIG. 7 shows an exemplary XR message 700 that may be used in the XR mode. Message 700 includes a preamble field 710, a signal field 720, and a data field 730. The format of preamble field 710 may be dependent on radio technology. In the exemplary design shown in FIG. 7, XR message 700 includes multiple repetitions of short training field (STF) 612, multiple repetitions of long training field (LTF) 614, multiple repetitions of signal field 620, and multiple repetitions of data field 630.

In general, each field of an NR message may be repeated any number of times (e.g., 1, 2, 4, 8 or more times) in an XR message in order to extend the range of the XR message. For example, only STF 612 and LTF 614 may be repeated, and other fields of NR message 600 may not be repeated. Different fields may be repeated by the same number of times or different numbers of time. For example, STF field 612 may be repeated four times, and LTF field 614 may be repeated only two times. Furthermore, only a portion of a given field may be repeated. For example, only a subset of signal field 620 (e.g., corresponding to more relevant information) may be repeated. Repetition may be performed in the same manner or different manners for different XR messages. For example, the number of times one or more fields or portions of fields are repeated may vary from message to message.

Repetition of all or a portion of a message may be performed in various manners. In one design, repetition may be performed by replicating a time-domain sequence as many times as desired. In another design, repetition may be performed by replicating frequency-domain symbols as many times as desired, mapping these symbols to subcarriers, and transforming the mapped symbols to obtain a time-domain sequence. In other designs, repetition may be performed by repeating data bits prior to encoding, or repeating code bits after encoding and prior to modulation, or repeating modulation symbols after modulation, or repeating OFDM symbols, etc.

Extended range may also be obtained with other mechanisms instead of repetition. In one design, a longer training sequence may be used for a training field instead of repeating a training sequence multiple times. In other designs, a lower code rate, a lower modulation order, a longer spreading factor, a higher transmit power level, or a combination thereof may be used to extend range. In yet another design, a message or a field may be transmitted over a smaller bandwidth at a higher transmit power level per subcarrier.

An XR message may be generated in a predetermined manner. For example, one or more fields may be repeated, and each field may be repeated a predetermined number of times. This design may simplify operation in the XR mode.

An XR message may also be generated in a configurable manner based on one or more parameters. In one design, which fields to repeat and/or the number of times to repeat each field may be dependent on the one or more parameters. The parameter(s) may relate to signal-to-noise ratio (SNR), desired range, etc. The number of times to repeat a field may be selected based on measured SNR and/or desired range such that the XR message can be reliably received. In another design, different types of processing may be performed based on the one or more parameters. For example, a lower code rate and/or a lower modulation order may be used for SNR below a first threshold, and repetition may be used for SNR below a second threshold that is lower than the first threshold.

As shown in FIGS. 3 to 5, messages or frames transmitted by different stations (or even the same station) may be separated by a time interval referred to as interframe space (IFS). 802.11 supports the following four different IFSs:

SIFS—short interframe space,
PIFS—point coordination function (PCF) interframe space,
DIFS—distributed coordination function (DCF) interframe space, and
EIFS—extended interframe space.

The four IFSs are listed in order based on their duration, with SIFS being the shortest and EIFS being the longest. The four different IFSs are defined to provide different priority levels for access to the wireless medium.

Figure 8:
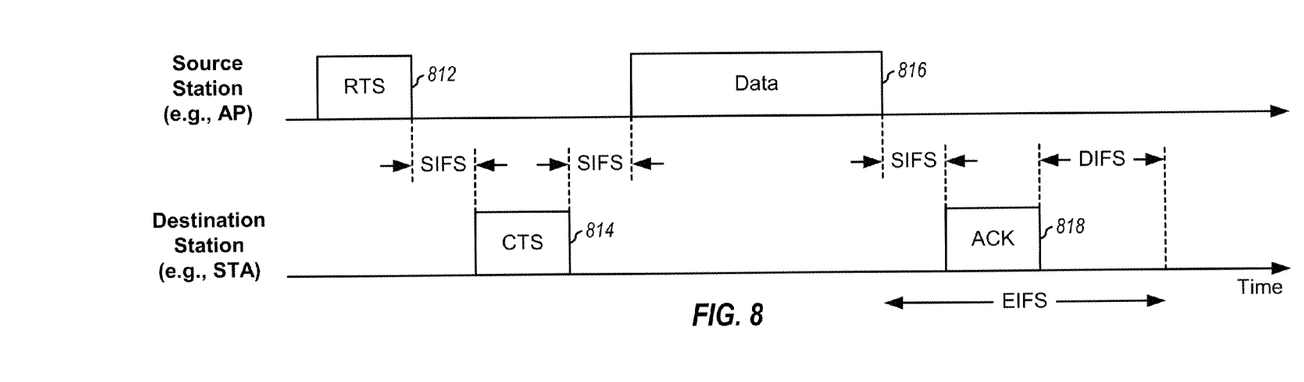
FIG. 8 shows data transmission in the NR mode.

FIG. 8 shows data transmission in the NR mode with IFSs between successive frames. A source station (e.g., access point 110) may initially transmit an RTS message 812 via the wireless medium. A destination station (e.g., NR station 120) may receive the RTS message, wait a SIFS time, and then transmit a CTS message 814. The source station may receive the CTS message, wait a SIFS time, and transmit data 816. The destination station may receive the data, wait a SIFS time, and transmit ACK 818. Other stations may wait DIFS time after the end of the ACK transmission prior to accessing the wireless medium. EIFS includes the amount of time it takes to transmit ACK at a predetermined rate (e.g., 1 Mbps).

Figure 9:
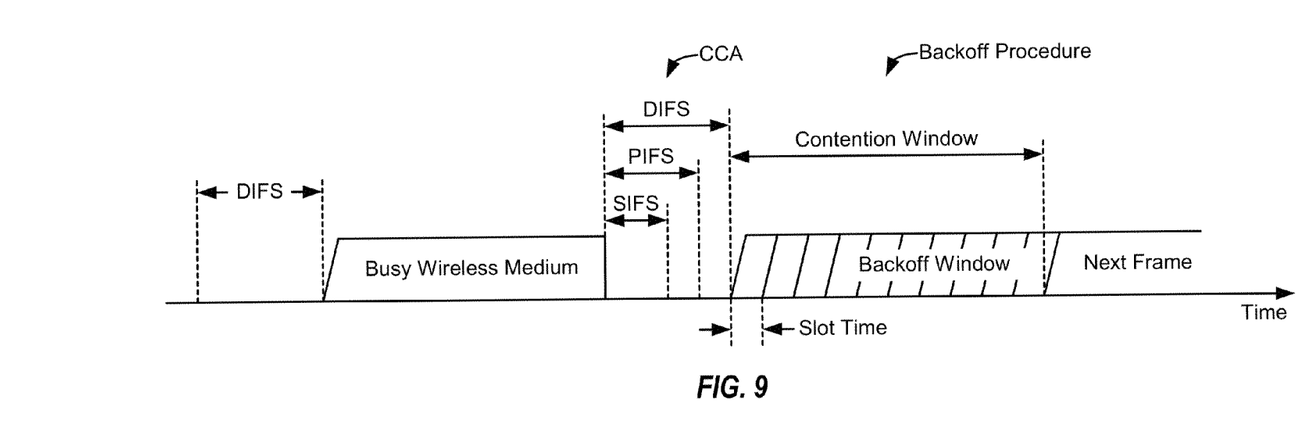
FIG. 9 shows clear channel assessment and backoff procedure.

FIG. 9 shows CCA and backoff procedure in 802.11. A station may perform CCA to determine whether the wireless medium is clear or busy prior to transmitting on the wireless medium. For CCA, the station may measure the energy of the wireless network in each time slot to obtain an energy measurement for that time slot. The station may determine whether the wireless medium is clear or busy based on energy measurements for different time slots. In particular, the station may deem that the wireless medium is clear if the energy measurements are below a threshold for IFS, which may be SIFS, PIFS, or DIFS depending on the priority of the station. For example, the station may wait for the wireless medium to be clear for SIFS time prior to transmitting ACK in response to reception of a data transmission. The station may wait for the wireless medium to be clear for DIFS time prior to performing an access procedure to access the wireless medium.

In another aspect of the present disclosure, slot time and/or IFS may be modified in order to support co-existence between NR stations and XR stations. Slot time is the duration of a time slot over which an energy measurement may be made by a station. Slot time may be defined as follows:

$$aSlotTime = aCCATime + aRxTxTurnaroundTime + aAirPropagationTime + aMACProcessingDelay \quad \text{Eq (1)}$$

where aSlotTime is the duration of one time slot (i.e., slot time), aCCATime is a minimum time that a CCA mechanism has available to assess the wireless medium in each time slot to determine whether the wireless medium is busy or idle, aRxTxTurnAroundTime is a maximum time to change from receiving to transmitting, aAirPropagationTime is the time it takes a signal to travel from a transmitting station to a receiving station, and aMACProcessingDelay is a nominal time that MAC uses to process a frame and prepare a response to the frame.

PIFS and DIFS may be defined based on slot time, and EIFS may be defined based on DIFS, as follows:

$$PIFS = aSIFSTime + aSlotTime, \quad \text{Eq (2)}$$

$$DIFS = aSIFSTime + 2*aSlotTime, \text{ and} \quad \text{Eq (3)}$$

$$EIFS = aSIFSTime + (8*ACKSize) + aPreambleLength + aPLCPHeaderLength + DIFS \quad \text{Eq (4)}$$

where aSIFSTime is the duration of SIFS,
aPreambleLength is the duration of a preamble of a message,
aPLCPHeaderLength is the duration of the PLCP header, and
ACKSize is the size of ACK.

SIFS time is a nominal time to receive the last symbol of a frame/message, process the frame, and respond with the first symbol of the earliest possible response frame. SIFS time may be defined in 802.11 or may be selected by an access point if multiple values are allowed.

In a first design, slot time and DIFS may both be scaled and extended based on the length of a preamble of an XR message, so that the XR preamble can be measured by stations within one time slot. In equation (1), aCCATime may be dependent on the XR preamble length, and other parameters may be fixed. As show in equation (1), the slot time may be extended by an amount that is determined by the increase in the length of an XR preamble (which affects aCCATime) versus an NR preamble. DIFS may be extended by an amount determined by the increase in slot time. EIFS may be increased to accommodate ACK in the XR mode.

Table 1 lists the values of aCCATime, DelayTime, aSlotTime, aSIFSTime, and DIFS for (i) a first case of no repetition in the NR mode, (ii) a second case of two times repetition in the XR mode based on the first design, and (iii) a third case of four times repetition in the XR mode based on the first design. DelayTime may be equal to the sum of aRxTxTurnAroundTime, aAirPropagationTime, and aMACProcessingDelay. Table 1 shows exemplary values in accordance with one design. Other values may also be used for the parameters in Table 1.

TABLE 1

| Parameter | No Repetition for NR mode | 2x Repetition for XR Mode | 4x Repetition for XR Mode |
|---|---|---|---|
| aCCATime | 40 µs | 80 µs | 120 µs |
| DelayTime | 10 µs | 10 µs | 10 µs |
| aSlotTime | 77 µs | 117 µs | 137 µs |
| aSIFSTime | 166 µs | 186 µs | 186 µs |
| DIFS | 320 µs | 420 µs | 460 µs |

In a second design, DIFS may be increased based on the length of an XR preamble, and slot time may be maintained. This design may ensure that the time taken by an NR station to count down its backoff counter will exceed the time needed by an XR station to perform CCA. EIFS may be increased to accommodate ACK in the XR mode.

In a third design, slot time and DIFS may be maintained, and the sensitivity of a CCA receiver at a station may be increased to enable detection of an XR preamble within slot time for the NR mode. For example, sensitivity of the CCA receiver may be increased by approximately 8 dB to enable detection of an XR preamble with approximately 8 dB of extended range within one time slot for the NR mode. In this design, even though the XR preamble may be longer than an NR preamble, the CCA receiver can detect the XR preamble in approximately the same amount of time as for the NR preamble due to the increased sensitivity of the CCA receiver. If the XR preamble can be detected within slot time by the CCA receiver with increased sensitivity, then DIFS does not need to be increased.

As shown in FIG. 9, a station may detect the wireless medium to be clear for DIFS time. The station may then perform a backoff procedure prior to transmitting on the wireless medium. For the backoff procedure, the station may select a random value and may initialized a countdown timer with the random value. The station may then make an energy measurement in each time slot (e.g., in approximately 40 μs of each time slot based on an energy measurement over an OFDM symbol). The station may (i) decrement the countdown timer by one for each time slot in which the station determines that the wireless medium is clear and (ii) maintain the countdown timer for each time slot in which the station determines that the wireless medium is busy. If the wireless medium is determined to be busy in any time slot during the backoff procedure, the station may wait for the wireless medium to be clear for DIFS time prior to resuming the backoff procedure.

In yet another aspect of the present disclosure, a station may make energy measurements over multiple time slots during the backoff procedure in order to support co-existence between NR stations and XR stations. An energy measurement may be made over a measurement period, which may cover multiple time slots, in order to accumulate more energy from an XR message. The measurement period may be defined based on the length of the preamble of the XR message and/or other factors. The slot time may be maintained as defined in 802.11 (i.e., not extended) in order to avoid impacting the backoff procedure and/or other procedures.

In one design, a station may perform the backoff procedure by initializing a countdown timer with a random value. The station may then make an energy measurement in each measurement period covering multiple slots. A measurement period may cover N time slots, where N may be any integer value greater than one. The station may make an energy measurement over N time slots to obtain a first energy value, then another energy measurement over the following N time slots to obtain a second energy value, then another energy measurement over the next N time slots to obtain a third energy value, etc. The station may (i) decrement the countdown timer by N in each measurement period in which the station determines that the wireless medium is clear and (ii) maintain the countdown timer in each measurement period in which the station determines that the wireless medium is busy. In one design, if the wireless medium is determined to be busy in any measurement period during the backoff procedure, the station may wait for the wireless medium to be clear for an extended DIFS time prior to resuming the backoff procedure.

Figure 10:
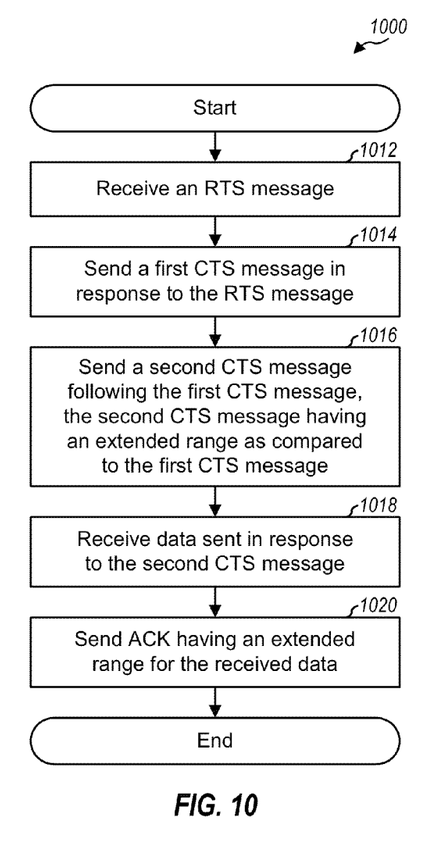
FIGS. 10 to 14 show various processes for communicating in a wireless network.

FIG. 10 shows an exemplary design of a process 1000 for communicating in a wireless network. Process 1000 may be performed by a station (e.g., access point 110 or station 122 in FIG. 1) or by some other entity. The station may receive an RTS message (e.g., RTS message 412 in FIG. 4) (block 1012). The station may send a first CTS message (e.g., CTS message 414 in FIG. 4) in response to the RTS message (block 1014). The station may also send a second CTS message (e.g., CTS message 416) following the first CTS message (block 1016). The second CTS message may have an extended range as compared to the first CTS message. The station may thereafter receive data (e.g., data 418) sent in response to the second CTS message (block 1018). The station may send ACK (e.g., ACK 420) having an extended range for the received data (block 1020).

In one design, the RTS message in block 1012 may be for an extended range mode and may also have a longer range. In another design, the RTS message may be for a non-extended range mode and may have a nominal range.

In one design, the first CTS message in block 1014 may be intended for stations not supporting the extended range mode. The second CTS message in block 1016 may be intended for a station sending the RTS message and other stations supporting the extended range mode. In one design, the first CTS message may comprise a first preamble of a first length. The second CTS message may comprise a second preamble of a second length longer than the first length. The second preamble may comprise multiple repetitions of at least one training field (e.g., short training field 612 and/or long training field 614 in FIGS. 6 and 7) in the first preamble. The second CTS message may also comprise repetitions of other fields.

In one design, the ACK in block 1020 may be for the extended range mode and may also have a longer range. In another design, the ACK may be for the non-extended range mode and may have a nominal range.

Figure 11:
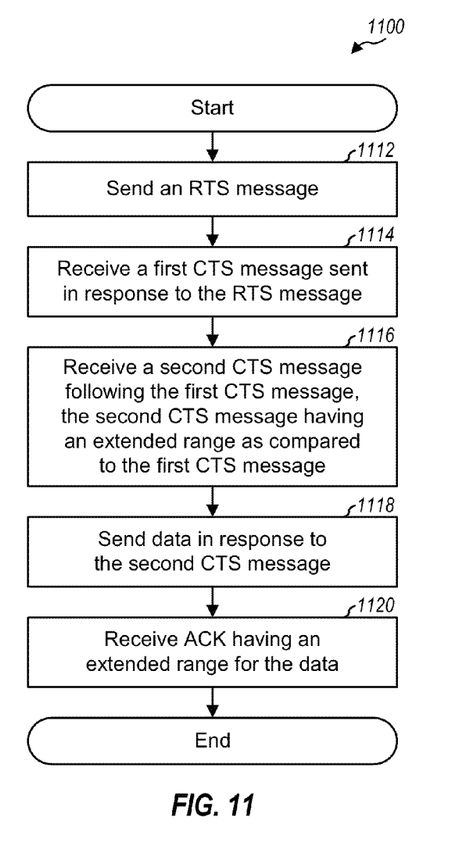

FIG. 11 shows an exemplary design of a process 1100 for communicating in a wireless network. Process 1100 may be performed by a station (e.g., access point 110 or station 122 in FIG. 1) or by some other entity. The station may send an RTS message, which may be for an extended range mode (block 1112). The station may receive a first CTS message sent in response to the RTS message (block 1114). The station may also receive a second CTS message following the first CTS message (block 1116). The second CTS message may have an extended range as compared to the first CTS message. The second CTS message may comprise a preamble of a longer length than a preamble of the first CTS message. The second CTS message may comprise multiple repetitions of at least one training field and/or other fields. The station may send data in response to the second CTS message (block 1118). The station may receive ACK having an extended range for the data (block 1120).

Figure 12:
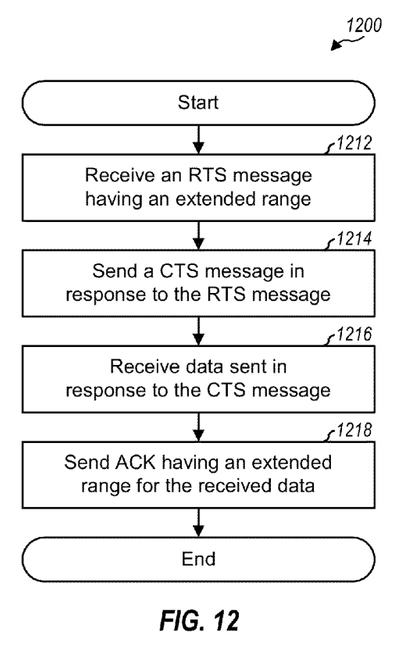

FIG. 12 shows an exemplary design of a process 1200 for communicating in a wireless network. Process 1200 may be performed by a station (e.g., access point 110 or station 122 in FIG. 1) or by some other entity. The station may receive an RTS message (e.g., RTS message 512 in FIG. 5) having an extended range (block 1212). The station may send a CTS message (e.g., CTS message 514) in response to the RTS message (block 1214). The CTS message may also have an extended range. The station may receive data (e.g., data 516) sent in response to the CTS message (block 1216). The station may send ACK (e.g., ACK 518) having an extended range for the received data (block 1218). The RTS message, CTS message, and/or the ACK may each comprise a preamble including multiple repetitions of at least one training field and/or other fields to obtain the extended range.

Figure 13:
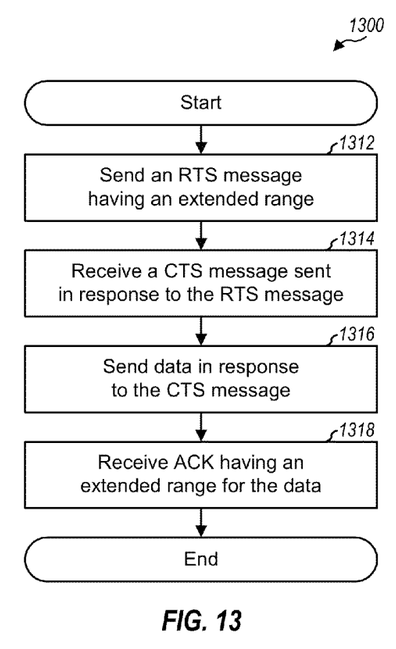

FIG. 13 shows an exemplary design of a process 1300 for communicating in a wireless network. Process 1300 may be performed by a station (e.g., access point 110 or station 122 in FIG. 1) or by some other entity. The station may send an RTS message (e.g., RTS message 512 in FIG. 5) having an extended range (block 1312). The station may receive a CTS message (e.g., CTS message 514) having an extended range sent in response to the RTS message (block 1314). The station may send data (e.g., data 516) in response to the CTS message (block 1316). The station may receive ACK (e.g., ACK 518) having an extended range for the data (block 1318).

Figure 14:
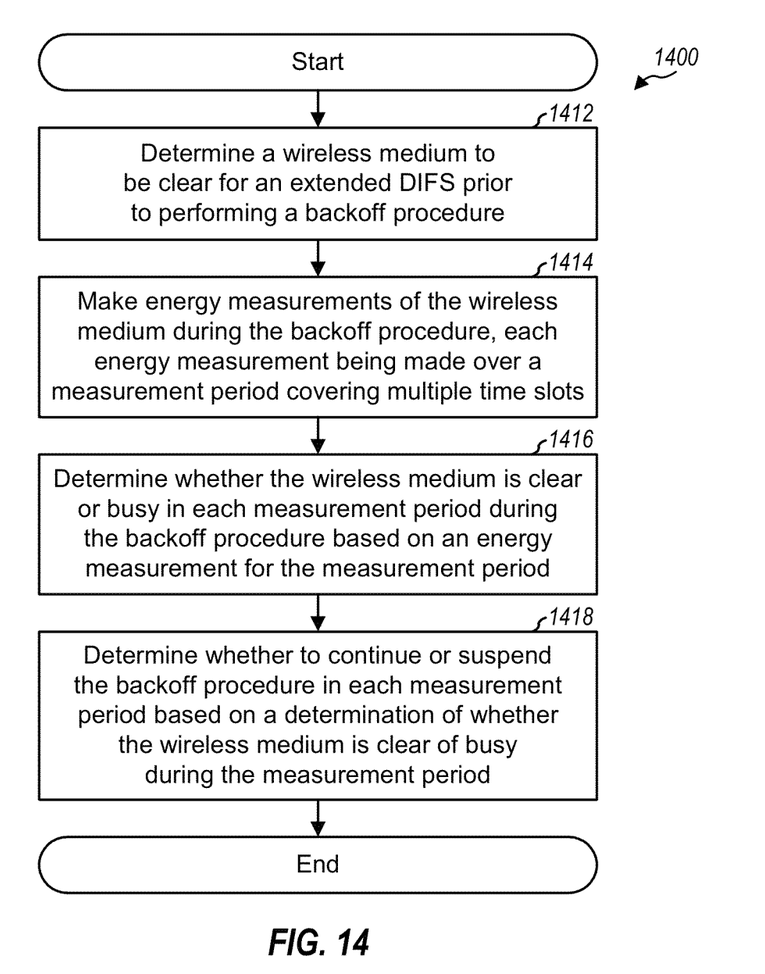

FIG. 14 shows an exemplary design of a process 1400 for communicating in a wireless network. Process 1400 may be performed by a station (e.g., access point 110 or station 122 in FIG. 1) or by some other entity. The station may perform CCA and may determine a wireless medium to be clear for an extended DIFS (block 1412). The extended DIFS may be for an extended range mode and may be longer than a DIFS for a non-extended range mode. In one design, the duration of the extended DIFS may be determined based on the length of a preamble of a message in the extended range mode, e.g., as shown in equation (3). The station may perform a backoff procedure after determining the wireless medium to be clear for the extended DIFS.

The station may make energy measurements of the wireless medium during the backoff procedure (block 1414). Each energy measurement may be made over a measurement period covering multiple time slots. The station may determine whether the wireless medium is clear or busy in each measurement period during the backoff procedure based on an energy measurement for that measurement period (block 1416). The station may determine whether to continue or suspend the backoff procedure in each measurement period based on a determination of whether the wireless medium is clear of busy during the measurement period (block 1418).

In one design, the station may detect the wireless medium to be busy in a measurement period. The station may suspend the backoff procedure in response to detecting the wireless medium to be busy in the measurement period. The station may resume the backoff procedure after detecting the wireless medium to be clear for the extended DIFS.

In one design, the station may detect a message transmitted via the wireless medium. The station may then wait for the wireless medium to be clear for an EIFS for the extended range mode. The EIFS for the extended range mode may be longer than an EIFS for the non-extended range mode. In one design, the duration of the EIFS for the extended range mode may be determined based on the length of a preamble of a message in the extended range mode, e.g., as shown in equation (4). The station may wait for the wireless medium to be clear for EIFS if a message is detected or for DIFS if energy is detected, prior to performing the backoff procedure. The station may detect a message by processing the preamble of the message.

Figure 15:
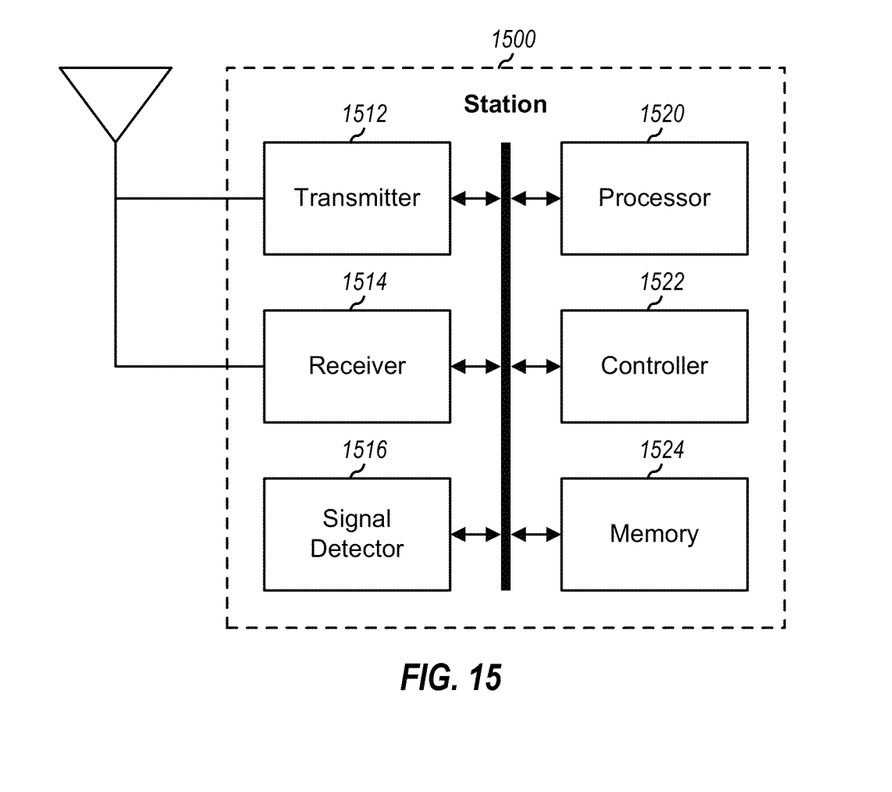
FIG. 15 shows a block diagram of a station.

FIG. 15 shows a block diagram of an exemplary design of a station 1500, which may correspond to access point 110, station 120, or station 122 in FIG. 1. Within station 1500, a transmitter 1512 may receive messages and/or data to be transmitted and may generate an output radio frequency (RF) signal comprising the messages and/or data. A receiver 1514 may receive and process a received RF signal and provide samples. Station 1500 may also include multiple transmitters and/or multiple receivers. A signal detector 1516 may make energy measurements, e.g., in each measurement period covering multiple time slots. Signal detector 1516 may determine whether the wireless medium is busy or clear in each measurement period based on the energy measurement for the measurement period.

A processor 1520 may perform various functions for station 1500. For example, processor 1520 may perform processing for data and/or messages being sent by station 1500 and processing for data and/or messages being received by station 1500. A controller 1522 may control the operation of various modules within station 1500. Processor 1520 and/or controller 1522 may be implemented with one or more digital signal processors (DSPs), microprocessors, etc. Processor 1520, controller 1522, and/or other modules within station 1500 may perform or direct process 1000 in FIG. 10, process 1100 in FIG. 11, process 1200 in FIG. 12, process 1300 in FIG. 13, process 1400 in FIG. 14, and/or other processes for the techniques described herein. A memory 1524 may store program codes and data for data processor 1520 and/or controller 1522.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a Request-to-Send (RTS) message;
   sending a non-extended range Clear-to-Send (CTS) message having a first preamble in response to the RTS message;
   sending an extended range CTS message having a second preamble following the non-extended range CTS message;
   measuring an energy of a wireless medium over a measurement period determined by a length difference between a length of the first preamble and a length of the second preamble;
   receiving data sent in response to the extended range CTS message; and
   sending an extended range acknowledgement (ACK) in response to the received data.

2. The method of claim 1, wherein the non-extended range CTS message is intended for stations not supporting an extended range mode, and wherein the extended range CTS message is intended for a station sending the RTS message and stations supporting the extended range mode.

3. The method of claim 2, wherein the RTS message is for the extended range mode.

4. The method of claim 1, wherein the length of the second preamble is longer than the length of the first preamble.

5. The method of claim 4, wherein the second preamble comprises multiple repetitions of at least one training field in the first preamble.

6. An apparatus for wireless communication, comprising:
   at least one processor configured to:
   receive a Request-to-Send (RTS) message;
   send a non-extended range Clear-to-Send (CTS) message having a first preamble in response to the RTS message;
   send an extended range CTS message having a second preamble following the non-extended range CTS message;
   measure an energy of a wireless medium over a measurement period determined by a length difference between a length of the first preamble and a length of the second preamble;
   receive data sent in response to the extended range CTS message; and
   send an extended range acknowledgement (ACK) in response to the received data.

7. The apparatus of claim 6, wherein the length of the second preamble is longer than the length of the first preamble.

8. The apparatus of claim 7, wherein the second preamble comprises multiple repetitions of at least one training field in the first preamble.

9. An apparatus for wireless communication, comprising:
   means for receiving a Request-to-Send (RTS) message;
   means for sending a non-extended range Clear-to-Send (CTS) message having a first preamble in response to the RTS message;
   means for sending an extended range CTS message having a second preamble following the non-extended range CTS message;
   means for measuring an energy of a wireless medium over a measurement period determined by a length difference between a length of the first preamble and a length of the second preamble;
   means for receiving data sent in response to the extended range CTS message; and
   means for sending an extended range acknowledgement (ACK) in response to the received data.

10. The apparatus of claim 9, wherein the length of the second preamble is longer than the length of the first preamble.

11. The apparatus of claim 10, wherein the second preamble comprises multiple repetitions of at least one training field in the first preamble.

12. A computer program product, comprising:
    a non-transitory computer-readable medium comprising:
    code for causing at least one computer to receive a Request-to-Send (RTS) message;
    code for causing the at least one computer to send a non-extended range Clear-to-Send (CTS) message having a first preamble in response to the RTS message;
    code for causing the at least one computer to send an extended range CTS message having a second preamble following the non-extended range CTS message;
    code for causing the at least one computer to measure an energy of a wireless medium over a measurement period determined by a length difference between a length of the first preamble and a length of the second preamble;

code for causing the at least one computer to receive data sent in response to the extended range CTS message; and code for causing the at least one computer to send an extended range acknowledgement (ACK) in response to the received data.

13. A method for wireless communication, comprising:

receiving an extended range Request-to-Send (RTS) message;

sending an extended range Clear-to-Send (CTS) message having a second preamble in response to the extended range RTS message;

sending a non-extended range CTS message having a first preamble in response to the extended range RTS message;

measuring an energy of a wireless medium over a measurement period determined by a length difference between a length of the first preamble and a length of the second preamble;

receiving data sent in response to the extended range CTS message; and sending an extended range acknowledgement (ACK) in response to the received data.

14. The method of claim 13, wherein the extended range RTS message comprises a preamble including multiple repetitions of at least one training field.

15. The method of claim 13, wherein the extended range CTS message is intended for a station sending the extended range RTS message and stations supporting an extended range mode.

16. An apparatus for wireless communication, comprising:
at least one processor configured to:

receive an extended range Request-to-Send (RTS) message;

send an extended range Clear-to-Send (CTS) message having a second preamble in response to the extended range RTS message;

send a non-extended range CTS message having a first preamble in response to the extended range RTS message;

measure an energy of a wireless medium over a measurement period determined by a length difference between the a length of the first preamble and a length of the second preamble;

receive data sent in response to the extended range CTS message; and send an extended range acknowledgement (ACK) for in response to the received data.

17. The apparatus of claim 16, wherein the extended range RTS message comprises a preamble including multiple repetitions of at least one training field.

* * * * *